United States Patent
Noelle et al.

(10) Patent No.: US 6,874,980 B1
(45) Date of Patent: Apr. 5, 2005

(54) CONTROLLER FOR THE ELECTRIC MOTOR OF A HIGH-SPEED SPINDLE ATTACHMENT USED WITH COMPUTER-CONTROLLED MILLING MACHINES

(76) Inventors: John A Noelle, 408 45 St. W., Bradenton, FL (US) 34209; Thomas J Noelle, 1724-81 St. Northwest, Bradenton, FL (US) 34209

( * ) Notice: Subject to any disclaimer, the term of this patent is extended or adjusted under 35 U.S.C. 154(b) by 209 days.

(21) Appl. No.: 10/280,736

(22) Filed: Oct. 25, 2002

(51) Int. Cl.[7] .............................. B23C 1/00; B23F 1/00; G06F 19/00
(52) U.S. Cl. ....................... 409/131; 409/183; 409/197; 409/210; 408/6; 408/9; 700/174
(58) Field of Search ................................ 409/131, 186, 409/187, 193, 194, 207; 408/6, 9, 10; 700/79, 700/177, 174, 175; 318/561, 569

(56) References Cited

U.S. PATENT DOCUMENTS

| | | | |
|---|---|---|---|
| 3,545,310 A | * 12/1970 | Greenberg et al. | 408/11 |
| 3,634,664 A | * 1/1972 | Valek | 318/561 |
| 4,604,006 A | * 8/1986 | Shoji et al. | 408/76 |
| 4,713,770 A | * 12/1987 | Hayes et al. | 700/175 |
| 4,822,215 A | * 4/1989 | Alexander | 408/9 |
| 5,096,339 A | * 3/1992 | Shoji | 408/6 |
| 5,727,912 A | * 3/1998 | Rubashkin et al. | 409/132 |
| 5,878,476 A | 3/1999 | Noelle | |
| 5,914,881 A | * 6/1999 | Trachier | 700/160 |
| 5,996,329 A | * 12/1999 | Cardenas | 409/230 |
| 6,060,854 A | * 5/2000 | Yutkowitz | 318/574 |
| 6,161,995 A | * 12/2000 | Wakazono et al. | 409/191 |
| 6,438,446 B1 | * 8/2002 | Trachier | 700/180 |
| 6,724,167 B1 | * 4/2004 | Tanaka | 318/569 |
| 6,807,887 B2 | * 10/2004 | Babuder et al. | 82/129 |

\* cited by examiner

*Primary Examiner*—A. L. Wellington
*Assistant Examiner*—Dana Ross
(74) *Attorney, Agent, or Firm*—Dorothy S. Morse

(57) ABSTRACT

An improved electronic controller for the motor of a high-speed spindle attachment used in conjunction with a cnc milling machine. The controller comprises preventative circuitry that protects the spindle assembly of the attachment from overload accruing as a result of relatively moderate increases in torque demand during use. The controller senses the power level being used by the motor while it causes high-speed spindle rotation, and when it identifies a power consumption rate by the spindle that exceeds the operator pre-set maximum level determined to be safe for avoiding catastrophic spindle damage, the electronic controller sends a signal back to the computer controlling the axes of the cnc milling machine that is sufficient to slow, pause, and/or stop the feed-rate.

16 Claims, 1 Drawing Sheet

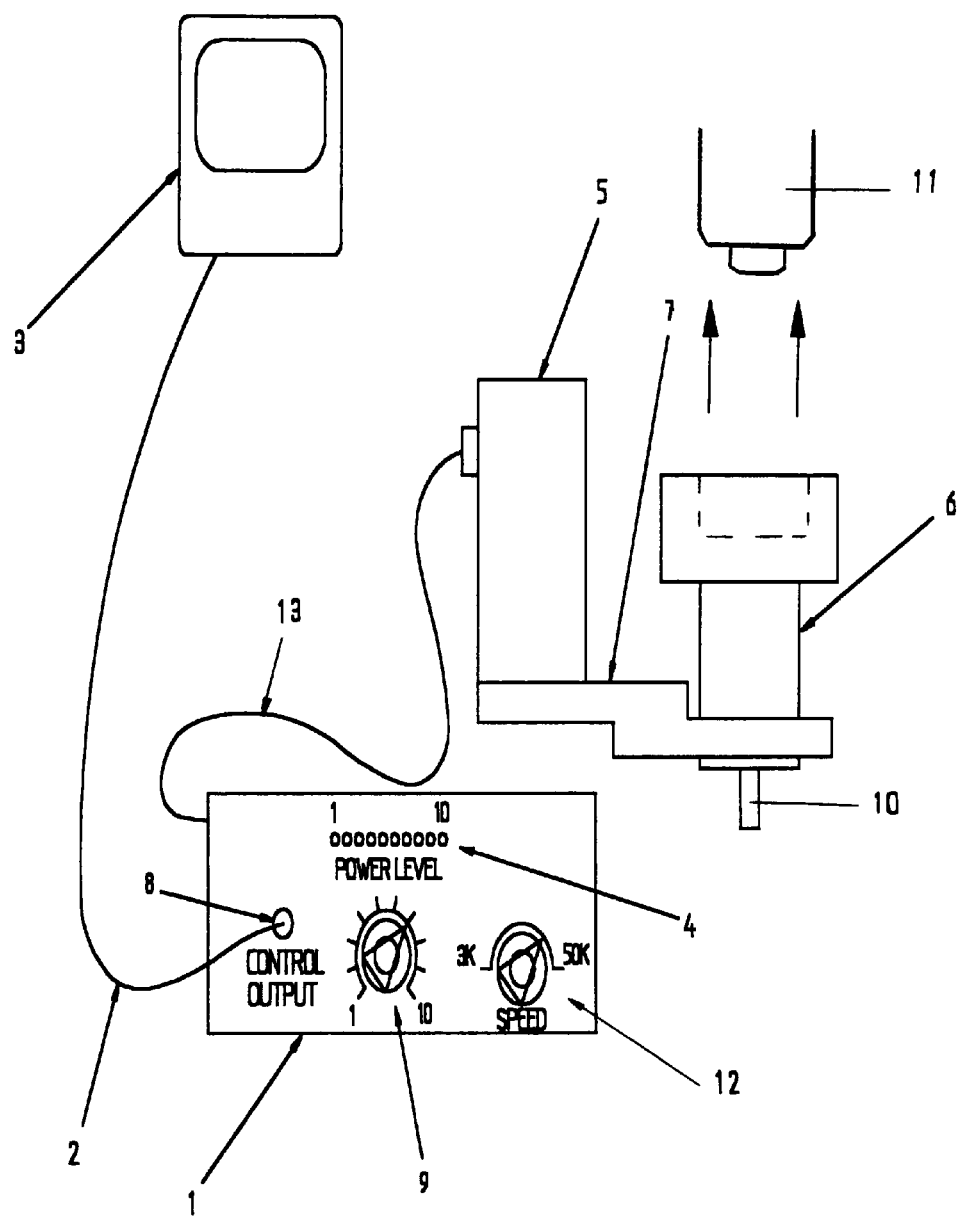

CONTROLLER FOR THE ELECTRIC MOTOR OF A HIGH-SPEED SPINDLE ATTACHMENT USED WITH COMPUTER-CONTROLLED MILLING MACHINES

CROSS-REFERENCE TO RELATED APPLICATIONS

None

BACKGROUND OF THE INVENTION

1. Field of the Invention

This invention relates to improvements in controllers for the electric motors of high-speed spindle attachments used with computer-controlled cnc milling machines, wherein such high-speed spindle attachments allow sustained spindle speeds up to and including speeds above 20,000 rpm in milling machines otherwise capable without attachments of only achieving maximum sustained spindle speeds of approximately 5000 rpm or less.

2. Description of the Related Art

A high-speed spindle attachment for milling machines otherwise having a sustained maximum spindle speed of approximately 5,000 rpm, can be made compact and efficient by utilizing a high-speed electric motor controlled by an electronic controller designed to maintain a constant speed even under widely varying loads, such as described in U.S. Pat. No. 5,878,476 to Noelle (1999). One not readily apparent problem inherent in such systems, is the potential for catastrophic damage to the spindle due to sudden power requirements beyond the level provided by the power supply and beyond the survivability of the motor to utilize. These sudden power requirements can occur unexpectedly when milling machine axes are under cnc control. The inherent problem stems from the fact that small high-power electric motors derive their power primarily from speed rather than torque. This speed/torque characteristic exposes the high-speed motors to overloads accruing from relatively moderate increases in torque demands. If the load imposed upon the motor exceeds the level for which it has been safely designed, the spindle will begin to slow down thereby increasing the chip load per tooth of the cutting tool. This further increases torque requirements in a regenerative fashion such that the process escalates quickly to the point that the spindle could stall completely while the machine axes are still moving, thereby causing major damage to the spindle before an operator would be able to realize what is happening and be able to slow the axes feed-rate. Other situations that may cause this problem include cnc grinding operations whereby a grinding wheel becomes clogged to the extent that rapidly accelerating torque demands occur. No known milling machine attachment for high-speed milling and grinding is known to include safeguards against this type of potential failure.

BRIEF SUMMARY OF INVENTION—OBJECTS AND ADVANTAGES

It is the primary object of this invention to provide protection against the risk of catastrophic damage to the spindles of high-speed milling and grinding attachments used with computer-controlled milling machines when sudden power requirements occur during use beyond the level provided by the power supply and beyond the survivability of the electric motors associated with the attachments to utilize. This is accomplished in the present invention by having the electronic controller of the high-speed spindle attachment sense the power level being used by the electric motor associated with the attachment, and send a signal back to the computer controlling the axes of the cnc milling machine to slow, pause, and/or stop the feed-rate of the machining process should the power level in the electric motor exceed an operator-selected predetermined amount. One communication option between the electronic controller and the milling machine computer would be to have a relay within the electronic controller that would be actuated, with the relay having its output connected to the control circuitry of the cnc. In the alternative, an analog signal or other efficient means of communication are also considered to be within the scope of the present invention. For operator convenience, the improved present invention controller would also have a display readily visible to the operator, which shows the power level being consumed by the high-speed machining spindle, to inform the operator of how close he or she is to reaching the maximum power level determined to be safe. Also, the most preferred embodiment of the present invention controller has an operator-selectable threshold power level control that can be used to lower the level at which precaution circuitry in the controller sends a signal to the computer controlling the axes of the associated milling machine to slow, pause, and/or stop the feed-rate of the machining process.

The description herein provides preferred embodiments of the improved present invention controller and the preferred embodiments should not be construed as limiting its scope. For example, variation in the size, location, and configuration of the power level display; the size, location, and configuration of the operator-selectable threshold power level control; the location of the control output; and the configuration of the controller housing; other than those components and features shown and described herein, may be incorporated into the present invention. Thus, the appended claims and their legal equivalents should be used determined the scope of the improved present invention controller, rather than the scope being limited to the examples given.

BRIEF DESCRIPTION OF THE SEVERAL VIEWS OF THE DRAWINGS

The sole illustration provided is a side view of the most preferred embodiment of the controller of the present invention connected between the motor of a high-speed machining attachment and the computer controlling a cnc milling machine.

DETAILED DESCRIPTION OF THE INVENTION

The most preferred embodiment of the controller improvement in the present invention is shown in the sole illustration provided. It consists of an electronic controller 1 having a variable speed control 12, a power level display 4, a multi-position switch 9 for operator-selectable threshold power level control, and a panel mounted bnc type connector 8, labeled "CONTROL OUTPUT", at the control output of electronic controller 1. It is contemplated in the most preferred embodiment of the present invention for connector 8 to be adapted the connection of a bnc cable 2. As a result, the sole illustration shows electronic controller 1 being connected via electronic wiring 13 to the motor 5 of a high-speed spindle attachment 6 and via a bnc cable 2 to computer 3. However, other effective and efficient communication means between electronic controller 1 and computer 3 are also considered to be within the scope of the present invention, such as an analog signal. Communication between computer 3 and milling machine 11 does also exist. However, such connection is not shown in the sole illustration since it is not a part of the present invention and it can be accomplished by a variety of wiring means. Thus, electronic controller 1 is connected between attachment 6 and the computer 3 controlling the axes of a milling machine 11 to which the upper housing of high-speed spindle attachment 6 is secured during use, including milling and grinding, for X, Y, Z movement of the spindle 10 that is shown in the sole illustration as extending downwardly beyond the lower portion of the housing employed for high-speed spindle attachment 6. High-speed spindle attachment 6 is configured to allow sustained speeds for spindle 10 up to and including speeds above 20,000 rpm when the upper housing of high-speed spindle attachment 6 is attached to milling machine 11 in the manner shown in the sole illustration by the pair of upwardly directed arrows and the broken lines positioned within the upper housing of high-speed spindle attachment 6. Without high-speed spindle attachment 6, milling machine 11 would only be capable of a maximum sustained spindle speed of approximately 5000 rpm and would not be expected to experience the speed/torque overloads addressed herein. The sole illustration also shows high-speed spindle attachment 6, and the motor 5 that provides its rotation, being mounted to opposing ends of the same support bracket 7. Electronic controller 1 is configured to contain preventive circuitry that senses the power level being used by motor 5, and shows that power level to the operator (not shown) of high-speed spindle attachment 6 via power level display 4. Electronic controller 1 is further configured to determine whether the power level being used by motor 5 is exceeding a user-selectable threshold level, as set by the operator prior to use by hand manipulation of multi-position switch 9. As soon as the user-selected threshold power level is exceeded, one option would be for the preventive circuitry in electric controller 1 to actuate a relay that has its output connected via bnc connector 8 and a bnc cable 2 to the control circuitry of the cnc computer 3. In the most preferred embodiment of the present invention electronic controller 1, its preventative circuitry would be located within the housing of electronic controller 1, with a panel-mounted bnc type connector 8 extending through the housing of electronic controller 1 that is adapted for connection of a bnc cable 2, with the other end of the bnc cable 2 being secured to cnc computer 3 so as to slow, pause, and/or stop control of the circuitry in cnc computer 3 in the event of a torque overload. In the alternative, an analog signal or other effective and efficient means could provide the communication link between electronic controller 1 and computer 3. In the most preferred embodiment of the present invention, multi-position switch 9 would enable the operator to select a range of various power threshold levels with the highest level designed to allow maximum power, yet still affording full protection to spindle 10, while providing lesser power levels available for the operator to use at his or her discretion for other purposes, such as protecting smaller cutters (not shown). The most preferred embodiment of the present invention would also have a power level display 4 that enables the operator to know how close the machining process is to reaching the maximum power level available as he or she adjusts the feed value of the cnc. Variation in the size, location, and configuration of the power level display 4 is contemplated, and a digital power level display 4 is considered to be a possible alternative for use to the sequence of lights shown in the sole illustration provided herein. Further, the size, location, and configuration of the multi-position switch 9 used for operator-selectable threshold power level control can be different from that shown in the sole illustration. In addition, the configuration of the housing for electronic controller 1 can be different from the rectangular housing shown, which is used for illustrative purposes only. As a result, the appended claims and their legal equivalents should be used determined the scope of the improved present invention controller, rather than the examples given herein.

What is claimed is:

1. An improved electronic controller for a milling machine attachment having a spindle whose high speed rotation is powered by an electric motor when the attachment is connected to a cnc milling machine with computer control, wherein the improvement comprises preventative circuitry in said electronic controller that senses the power level being used by the attachment motor such that if the power level exceeds a predetermined operator-set level, said preventative circuitry in said electronic controller will send an electronic signal to the computer controlling the axes of the milling machine that sufficiently slows, pauses, and/or stops the feed-rate of the machining process in order to preclude the catastrophic damage to the spindle which would otherwise be likely to occur without such intervention by said preventative circuitry of said electronic controller.

2. The improved electronic controller of claim 1 further comprising a power level display which is configured to visually inform an operator of the milling machine and attachment combination of the power level being consumed by the spindle during high speed rotation so that the operator can remain informed about how close the power consumption rate of the spindle is to reaching the operator pre-set maximum level determined to be safe to avoid spindle damage.

3. The improved electronic controller of claim 2 wherein said power level display comprises a plurality of lights that are configured for sequential lighting according to increases and decreases in power consumption rates, with one of said lights being a lowest power consumption indicating light, another of said lights being a highest power consumption indicating light, and the remainder of said lights positioned in sequence between said lowest power consumption indicating light and said highest power consumption indicating light, said power level display further comprising at least one informational marking associated with said lowest power consumption indicating light.

4. The improved electronic controller of claim 1 further comprising an operator-selectable threshold power level control adapted for lowering the level at which said electronic controller sends a signal to the computer controlling the axes of the milling machine connected to the high-speed machining attachment.

5. The improved electronic controller of claim 4 wherein said operator-selectable threshold power level control is a multi-position switch.

6. The improved electronic controller of claim 1 further comprising a bnc cable connector and a bnc cable adapted for electronic communication between said electronic controller and the computer controlling milling machine connected to the attachment.

7. Apparatus for electronic connection to a high-speed milling machine attachment, the milling machine being controlled by a computer and the attachment having a spindle and an electric motor, whereby the apparatus communicates with the computer to prevent spindle damage or failure as a result of sudden increases in power level requirements resulting from torque overload, said apparatus comprising:

an electronic controller having threshold power level control means, said controller also having preventative circuitry configured to sense the power level being used by the electric motor of the milling machine attachment; and electronic means adapted for communication between said controller and the milling machine computer so that when the power level exceeds a predetermined level established by an operator with said control means, said preventative circuitry will send an electronic signal to the computer to sufficiently slow, pause, and/or stop the feed-rate of the machining process.

8. The apparatus of claim 7 wherein said electronic controller further comprises a power level display configured to visually inform an operator of the power level being consumed by the spindle during high speed rotation so that the operator can remain informed about how close the power consumption level is to the pre-set maximum level considered to be safe in avoiding spindle damage.

9. The apparatus of claim 8 wherein said power level display comprises a plurality of lights that are configured for sequential lighting according to increases and decreases in power consumption rates, with one of said lights being a lowest power consumption indicating light, another of said lights being a highest power consumption indicating light, and the remainder of said lights positioned in sequence between said lowest power consumption indicating light and said highest power consumption indicating light, said power level display further comprising at least one informational marking associated with said lowest power consumption indicating light.

10. The apparatus of claim 7 wherein said threshold power level control means is a multi-position switch.

11. The apparatus of claim 1 wherein said electronic means adapted for communication between said controller and the milling machine computer comprises a bnc cable connector and a bnc cable.

12. A method for preventing spindle damage or failure as a result of sudden increases in power level requirements resulting from torque overload in high-speed milling machine attachments, said method comprising the steps of:

providing a milling machine with a high-speed attachment having a spindle and an electric motor, said milling machine also having a computer that controls the X, Y, Z movement of said spindle;

also providing an electronic controller adapted for controlling the rotational speed of said spindle, said electronic controller having threshold power level control means and preventative circuitry configured to sense the power level being used by the electric motor of the milling machine attachment;

also providing electronic communication means;

using said electronic communication means to establish communication between said electronic controller and said electric motor of said attachment;

also using said electronic communication means to establish communication between said electronic controller and said computer; and using said threshold power level control means to establish the maximum power level to be used by said electric motor before said preventative circuitry sends an electronic signal to said computer to slow, pause, and/or stop the feed-rate of the machining process a sufficient amount to protect said spindle from torque overload damage that would otherwise be caused by sudden increases in the power requirements of said electric motor.

13. The method of claim 12 wherein said electronic controller comprises a power level display configured to visually inform an operator of the power level being consumed by the spindle during high speed rotation so that the operator can remain informed about how close the power consumption level is to the pre-set maximum level considered to be safe in avoiding spindle damage.

14. The method of claim 13 wherein said power level display comprises a plurality of lights that are configured for sequential lighting according to increases and decreases in power consumption rates.

15. The method of claim 12 wherein said threshold power level control means comprises a multi-position switch.

16. The method of claim 1 wherein said electronic communication means comprises at least one bnc cable connector and at least one bnc cable.

* * * * *